(12) United States Patent
Petzold et al.

(10) Patent No.: US 6,257,500 B1
(45) Date of Patent: Jul. 10, 2001

(54) WINDOW AND LENS GLASS CLEANING SYSTEM FOR A MOTOR VEHICLE

(75) Inventors: Sven Petzold, Wiesbaden; Rainer Kober, Darmstadt, both of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/451,526

(22) Filed: Dec. 1, 1999

(30) Foreign Application Priority Data

Dec. 5, 1998 (DE) .............................................. 198 56 174

(51) Int. Cl.⁷ ...................................................... B05B 1/10
(52) U.S. Cl. ........................................................ 239/284.1
(58) Field of Search ............................... 239/284.1, 284.2; 15/250.001–250.003, 250.01, 250.02, 250.04, 250.05; 296/96.17

(56) References Cited

U.S. PATENT DOCUMENTS 4,285,470 * 8/1981 Roth .................................. 239/284.2
5,012,977 * 5/1991 Karklins et al. .................. 239/284.1
5,327,613 * 7/1994 Ohtsu .............................. 239/284.1 X
5,354,965 * 10/1994 Lee ................................. 239/284.2 X
5,497,058 * 3/1996 Fujigaya ......................... 239/284.2 X
5,561,882 * 10/1996 Eustache et al. ............. 239/284.1 X
5,946,763 * 9/1999 Egner-Walter et al. ....... 239/284.1 X
5,965,950 * 10/1999 Park .............................. 239/284.1 X

FOREIGN PATENT DOCUMENTS

2854178 * 6/1980 (DE) .................................. 239/284.1
4319920 * 12/1994 (DE) .
2269437 * 11/1975 (FR) .................................. 239/284.1
2419195 * 10/1979 (FR) .................................. 239/284.1

* cited by examiner

*Primary Examiner*—Lesley D. Morris
(74) *Attorney, Agent, or Firm*—Martin A. Farber

(57) ABSTRACT

A window and lens glass cleaning system for a motor vehicle has a constructional unit comprising a washer fluid container (1), a plurality of control units (7–9) and an evaluating device (12) of a fluid-level sensor (12a). This enables all of the essential components of the window and lens glass cleaning system to be preassembled and tested outside the motor vehicle. The window and lens glass cleaning system can then be installed in a particularly simple manner in the motor vehicle.

11 Claims, 2 Drawing Sheets

WINDOW AND LENS GLASS CLEANING SYSTEM FOR A MOTOR VEHICLE

FIELD AND BACKGROUND OF THE INVENTION

The invention relates to a window and lens glass cleaning system for a motor vehicle, having a washer fluid container for storing washer fluid, having at least one washer fluid pump which is arranged on or in the washer fluid container, for conveying washer fluid from the washer fluid container to washer nozzles to be arranged in front of motor vehicle windows and lenses, and having an electronic control unit for activating the washer fluid pump or the washer fluid pumps.

Such window and lens glass cleaning systems are frequently used in modern motor vehicles and are known from practical experience. In this case, the washer fluid container contains a washer fluid pump in each case for a windshield, a rear window and for headlight lenses of the motor vehicle. The washer fluid pumps can be activated independently of one another by operating elements arranged within the passenger cell of the motor vehicle. The electronic control unit is fastened at a splashproof location in the motor vehicle. Signal lines are routed from the control unit to the operating elements and supply lines for electric power are routed to the washer fluid pumps and to the motor vehicle electric network.

A disadvantageous feature in the known window and lens glass cleaning system is that its installation in the motor vehicle turns out to be very complicated. Furthermore, the window and lens glass cleaning system has first of all to be put together before it is installed in the motor vehicle for preliminary testing and then has to be taken apart again. A very great number of working steps are required for this.

SUMMARY OF THE INVENTION

The invention is based on the problem of providing a window and lens glass cleaning system of the type mentioned at the beginning in such a manner that it can be installed in as simple a manner as possible in the motor vehicle and can be tested in a very simple manner before it is installed in the motor vehicle.

According to the invention, this problem is solved by the control unit and the washer fluid container being formed as a constructional unit which can be preassembled.

This enables all of the electrical components of the window and lens glass cleaning system according to the invention to be preassembled and tested outside the motor vehicle. The invention means that after the testing there is no longer any need to separate the electronic control unit from the washer fluid container, since the constructional unit can be installed in a single operation. This makes the installation in the motor vehicle of the window and glass lens cleaning system according to the invention very simple. A further advantage of the window and lens glass cleaning system according to the invention is that the supply lines can be designed such that they are very short. Since the washer fluid pumps require starting currents of 30 to 50 amps, the supply lines are to be provided with a large cross section. A reduction in the length of the supply lines therefore results in a large reduction in the production costs of the window and lens glass cleaning system according to the invention.

Wipers of known window and lens glass cleaning systems for different windows and lenses of the motor vehicle in each case have their own electronic control units which enable them to be activated independently of one another. Furthermore, the known window and lens glass cleaning system has a further electronic control unit for activating heating elements for washer nozzles, washer fluid lines and the washer fluid container at low outside temperatures. Then, to further simplify the installation in the motor vehicle of the window and lens glass cleaning system according to the invention, it helps if at least one further electronic control unit of a heating device for the washer fluid, of a motor drive for moveable washer nozzles, of a multiway valve for distributing the washer fluid or of a wiper is fastened on the washer fluid container. Since this means that the control units for various components of the window and lens glass cleaning system are arranged in close proximity to one another, connecting up the control units to one another becomes particularly cost-effective. As a result, the operation of the wiper and of the washer nozzles, for example, can be very simply synchronized.

To further simplify the installation of the window and lens glass cleaning system according to the invention it helps if an evaluating device of a fluid-level sensor is fastened on the washer fluid container. Since in this arrangement the fluid-level sensor and the evaluating device are arranged in close proximity to one another, this design results in particularly cost-effective manufacturing of the window and lens glass cleaning system according to the invention.

According to another advantageous development of the invention, a plurality of fluid levels in the washer fluid container can be measured with particularly low constructional outlay if the fluid-level sensor has a plurality of contact plates embedded in the wall of the washer fluid container, for measuring the conductivity.

According to another advantageous development of the invention, the electronic control units and the evaluating device of the fluid-level sensor can be connected to one another in a simple manner if a plurality of the electronic control units and the evaluating device of the fluid-level sensor form a constructional central processing unit. This design simplifies connecting up the control units to one another, so that the controls, for example, only require a single supply line for electric current. Furthermore, the invention means that the control units and the evaluating device of the fluid-level sensor can have common hardware, such as a processor, for example, and common software.

The installation in the motor vehicle of the window and lens glass cleaning system according to the invention can be further simplified if the electronic control units and the evaluating device of the fluid-level sensor have a common connecting socket. Furthermore, this design enables the individual components of the window and lens glass cleaning system according to the invention to be connected in a very simple manner to a data bus.

According to another advantageous development of the invention, the electronic controls are protected from damage with a low constructional outlay if the washer fluid container has a trough for accommodating the electronic control units or the electronic control unit.

According to another advantageous development of the invention, the washer fluid container becomes particularly simple in terms of design if the trough can be closed by a lid which can be latched in the washer fluid container.

According to another advantageous development of the invention, the lid can be manufactured together with the washer fluid container in a particularly cost-effective manner if the lid is connected to the washer fluid container on one side via a film hinge. Furthermore, this design simplifies the installation of the window and lens glass cleaning system according to the invention. Moreover, the lid is unable to be lost.

According to another advantageous development of the invention an overfilling warning or a refilling indication for the washer fluid container can be generated with particularly low constructional outlay if an optical or acoustic signaling device for generating an overfilling warning and/or a signal when the fluid level falls short of the minimum is arranged on the evaluating device of the fluid-level sensor. This means that only an insignificant outlay for connecting up the signaling device is required. Furthermore, the invention means that the washer fluid container can be identified without a problem by the person refilling it. The easy identification simplifies the refilling, in particular in the case of a washer fluid container having separate chambers for washers, cleaning concentrate and antifreeze. A buzzer and a light-emitting diode are particularly suitable as the signaling device.

BRIEF DESCRIPTION OF THE DRAWINGS

The invention permits numerous embodiments. To further clarify its basic principle one of these is represented in the figures of the drawings and is described in the following. The drawings show in FIG. 1 a schematic representation of a window and lens glass cleaning system according to the invention, FIG. 2 a further embodiment of the window and lens glass cleaning system according to the invention, and FIG. 3 the window and lens glass cleaning system from FIG. 2 in a sectional representation along the line III—III.

DETAILED DESCRIPTION OF THE PREFERRED EMBODIMENT

Figure 1:
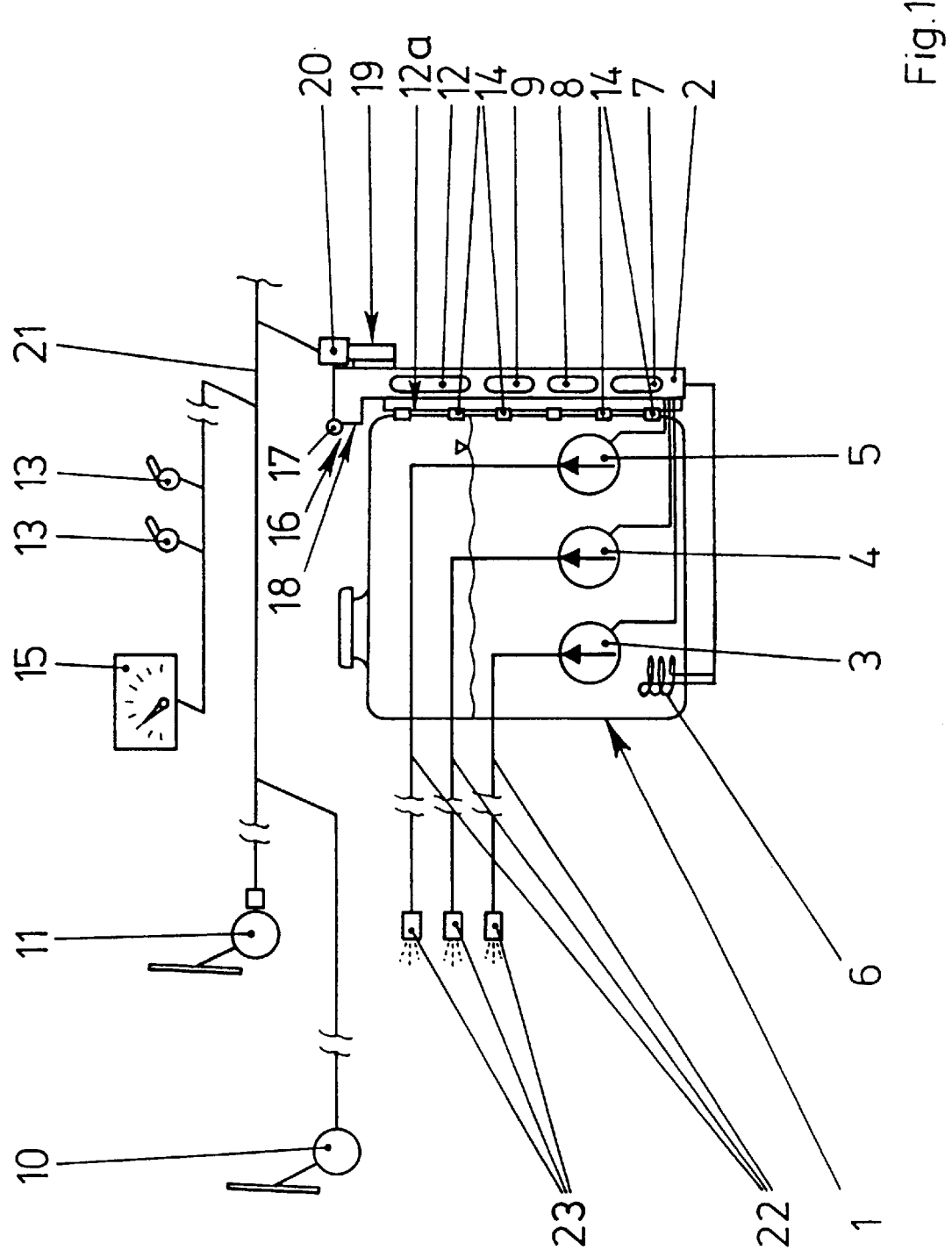

FIG. 1 shows, schematically, a window and lens glass cleaning system according to the invention having a washer fluid container 1 and an electronic central processing unit 2. The washer fluid container 1 has three washer fluid pumps 3–5 and a heating device 6. Within the electronic central processing unit 2, a respective electronic control unit 7–9 for the washer fluid pumps 3–5, the heating device 6 and for two wipers 10, 11 is arranged. Of course, the window and lens glass cleaning system according to the invention can have further control units, for example for moving washer nozzles or for operating a multiway valve for distributing washer fluid. Furthermore, the central processing unit 2 has an evaluating device 12 of a fluid-level sensor 12a for detecting a washer fluid level in the washer fluid container 1. The wipers 10, 11 and the washer fluid pumps 3–5 can be operated by operating elements 13. Of course, the wipers can additionally be connected upstream of a rain sensor (not shown). The heating device 6 is operated by one of the electronic control units 7–9 as a function of the outside temperature. The window and lens glass cleaning system according to the invention is protected by this means against freezing.

The evaluating device 12 of the fluid-level sensor 12a has a plurality of contact plates 14 penetrating the wall of the washer fluid container 1, and generates, by means of measuring the conductivity, electrical signals as a function of the washer fluid level in the washer fluid container 1. The electrical signals are then evaluated and sent to a display 15 for a driver's cockpit of the motor vehicle or to a signaling device 16 having a light-emitting diode 17 and a buzzer 18. This enables either an overfilling warning or a refilling requirement to be signaled. In this arrangement, the refilling requirement can be displayed permanently or, for example, only while a fuel tank of the motor vehicle is being refilled.

The electronic control units 7–9 and the evaluating device 12 have a common connecting socket 19, arranged on the upper side of the central processing unit 2, for a plug 20 of a supply network 21 of the motor vehicle. The supply network 21 is designed s a data bus and connects all of the electrical components of the window and lens glass cleaning system according to the invention. Furthermore, the electrical components are supplied with electric current via the supply network.

The washer fluid pumps 3–5 serve for conveying washer fluid from the washer fluid container 1 via washer fluid lines 22 to washer nozzles 23 to be arranged in front of windows and lenses (not shown). The display 15 and the operating elements 13 are provided for arrangement in a passenger cell (not shown) of the motor vehicle.

Figure 2:
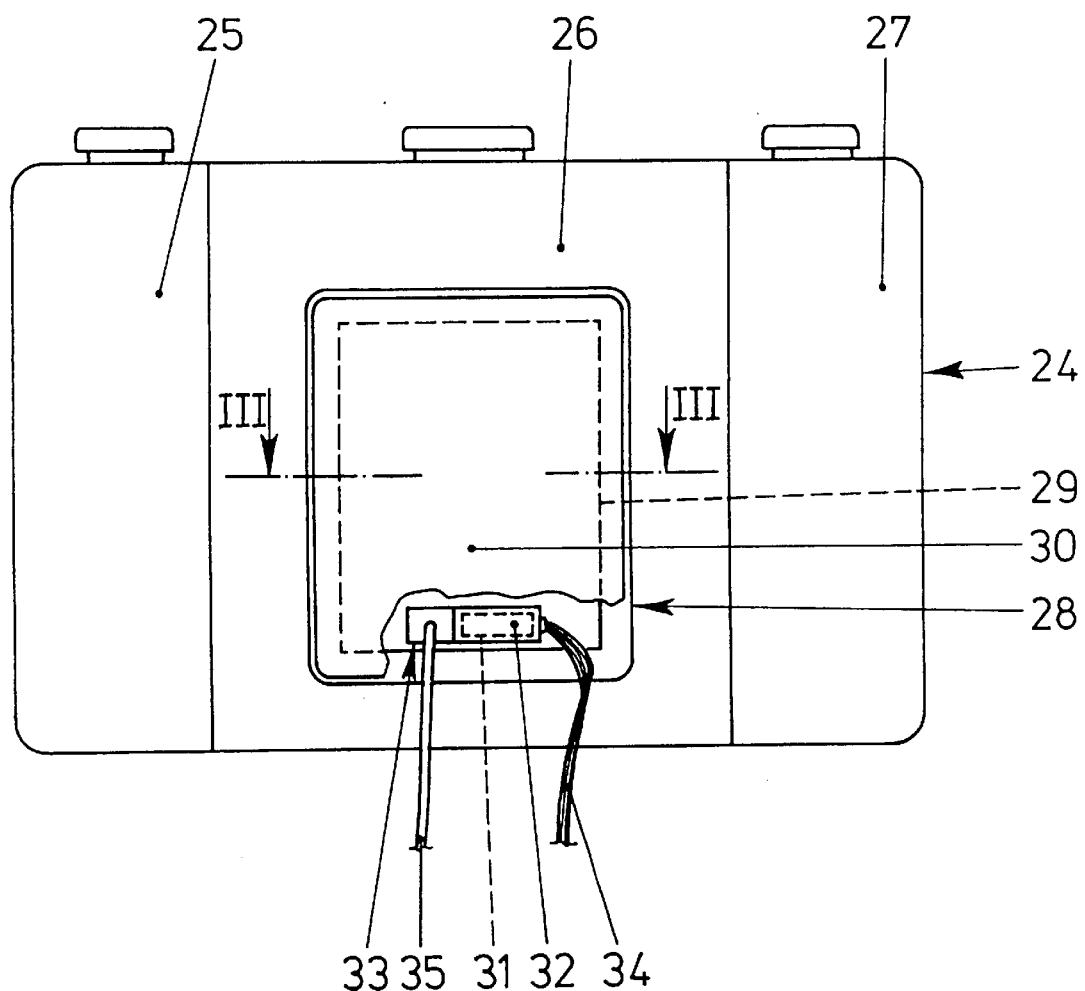

FIG. 2 shows a washer fluid container 24 having separate chambers 25–27 in each case for water, cleaning concentrate and antifreeze. The washer fluid container 24 has a trough 28 for accommodating a common electronic control unit 29 for the wipers (10, 11) and the washer fluid pump (3–5) which are shown in FIG. 1. The control unit 29 is protected by a lid 30. Furthermore, the electronic control unit 29 has a connecting socket 31 for a plug 32 of a data bus 34 and a connection 33 for supply lines 35 for supplying all of the window and lens glass cleaning system components arranged on or in the washer fluid container 24 with electric current.

Figure 3:
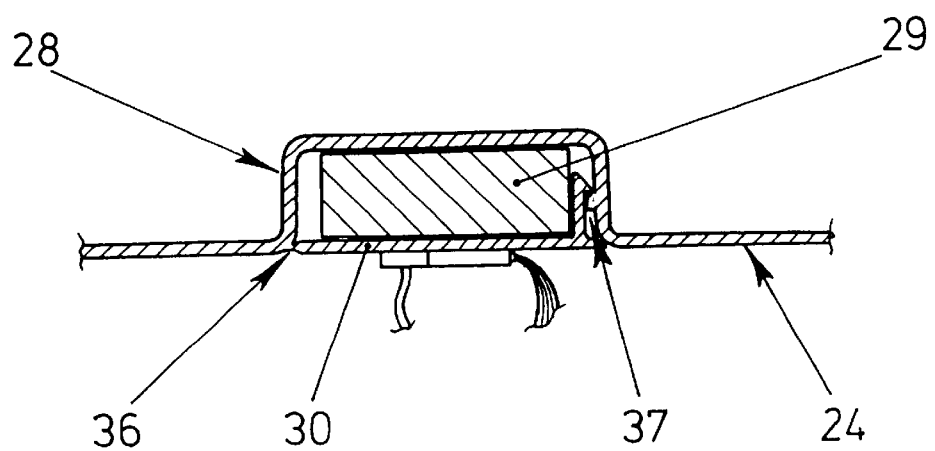

FIG. 3 shows the washer fluid container 24 from FIG. 2 in a sectional representation along the line III—III. In this case, it can be seen that the electronic control unit 29 is fitted between the lid 30 and the washer fluid container 24. A seal (not shown) and a dip-coating of the electronic control unit 29 ensure adequate protection against moisture. The lid 30 is connected to the washer fluid container 24 via a film hinge 36 and at its end which lies opposite the film hinge 36 has a latching connection 37 to the washer fluid container 24.

What is claimed is:

1. A window and lens glass cleaning system for a motor vehicle, comprising a washer fluid container for storing washer fluid, at least one washer fluid pump which is arranged on or in the washer fluid container, for conveying washer fluid from the washer fluid container to washer nozzles to be arranged in front of motor vehicle windows and lenses, an electronic control unit for activating the washer fluid pump or the washer fluid pumps, and an evaluating device of a sensor of level of fluid in the container, wherein the control unit and the evaluating device constitute a processing unit which is constructed as an integral assembly with the washer fluid container.

2. The window and lens glass cleaning system as claimed in claim 1, further comprising at least one further electronic control unit of a heating device for the washer fluid, of a motor drive for moveable washer nozzles, of a multiway valve for distributing the washer fluid or of a wiper, wherein said further electronic control unit is fastened on the washer fluid container.

3. The window and lens glass cleaning system as claimed in claim 1, wherein the evaluating device of a fluid-level sensor is fastened on the washer fluid container.

4. The window and lens glass cleaning system as claimed in claim 1, further comprising the fluid-level sensor, wherein the fluid level sensor has a plurality of contact plates embedded in a wall of the washer fluid container, for measuring conductivity.

5. The window and lens glass cleaning system as claimed in claim 1, wherein the washer fluid container has a trough for accommodating the electronic control units or the electronic control unit.

6. The window and lens glass cleaning system as claimed in claim 5, wherein the trough can be closed by a lid which is latchable in the washer fluid container.

7. The window and lens glass cleaning system as claimed in claim 6, wherein the lid is connected to the washer fluid container on one side via a film hinge.

8. The window and lens glass cleaning system as claimed in claim 1, further comprising an optical or acoustic signaling device for generating an overfilling warning and/or a signal when fluid level in said washer fluid container falls short of a minimum level, the signaling device being arranged on the evaluating device of the fluid-level sensor.

9. A window and lens glass cleaning system for a motor vehicle, comprising a washer fluid container for storing washer fluid, at least one washer fluid pump which is arranged on or in the washer fluid container, for conveying washer fluid from the washer fluid container to washer nozzles to be arranged in front of motor vehicle windows and lenses, and an electronic control unit for activating the washer fluid pump or the washer fluid pumps, wherein the control unit and the washer fluid container are a constructional unit which is preassemblable, and a plurality of the electronic control units and an evaluating device of a fluid-level sensor form a constructional central processing unit.

10. The window and lens glass cleaning system as claimed in claim 9, wherein the electronic control units and the evaluating device of the fluid-level sensor have a common connecting socket.

11. A window and lens glass cleaning system for a motor vehicle, comprising a washer fluid container for storing washer fluid, at least one washer fluid pump which is arranged on or in the washer fluid container, for conveying washer fluid from the washer fluid container to washer nozzles to be arranged in front of motor vehicle windows and lenses, an electronic control unit for activating the washer fluid pump or the washer fluid pumps, wherein the control unit is constructed as an integral assembly with the washer fluid container.

* * * * *